United States Patent [19]
McConnell et al.

[11] Patent Number: 6,148,093
[45] Date of Patent: Nov. 14, 2000

[54] METHODS AND DEVICE FOR VALIDATING A PERSONAL SIGNATURE

[76] Inventors: Gary A. McConnell, P.O. Box 872, N-8009 Bodø; Geirr I. Leistad, Jongsstubben 19, N-1300 Sandvika, both of Norway

[21] Appl. No.: 09/068,875

[22] PCT Filed: Sep. 18, 1997

[86] PCT No.: PCT/NO97/00254

§ 371 Date: Oct. 18, 1998

§ 102(e) Date: Oct. 18, 1998

[87] PCT Pub. No.: WO98/12661

PCT Pub. Date: Mar. 26, 1998

[30] Foreign Application Priority Data

Sep. 10, 1996 [NO] Norway ..................................... 963903

[51] Int. Cl.[7] .................................................. G06K 9/00
[52] U.S. Cl. ........................................ 382/119; 178/18.01
[58] Field of Search .................................... 382/119, 116, 382/188, 203, 204; 178/19.06, 18.01, 19.01, 18.03, 19.05; 348/161

[56] References Cited

U.S. PATENT DOCUMENTS 4,975,546  12/1990  Craig ..................................... 178/19.06
5,248,855  9/1993  Cambridge ............................... 178/18
5,453,015  9/1995  Vogel ..................................... 434/350
5,774,571  6/1998  Marshall ................................. 382/119

FOREIGN PATENT DOCUMENTS 0696 019 A2  2/1996  European Pat. Off. .

Primary Examiner—Bhavesh Mehta
Attorney, Agent, or Firm—Brinks Hofer Gilson & Lione

[57] ABSTRACT

An authenticated personal signature is stored in the database which can be compared to a newly presented signature for validation. The method for registering, analyzing and validating the hand-written personal signature requires that the signature be written in an x, y plane with a writing instrument which has a multiaxis movement detector at its end. The multiaxis movement detector detects the movement of said writing device as a function of time and with six degrees of freedom. The six degrees of freedom given by a linear movement along an x-axis, a y-axis and a z-axis, respectively, as well as by rotation about said x-axis, said y-axis and said z-axis, respectively. The six degrees of freedom of the writing instrument are recorded in predetermined formats in a database. A newly registered personal signature that is presented for validation is compared with the stored authenticated personal signature in the database.

20 Claims, 8 Drawing Sheets

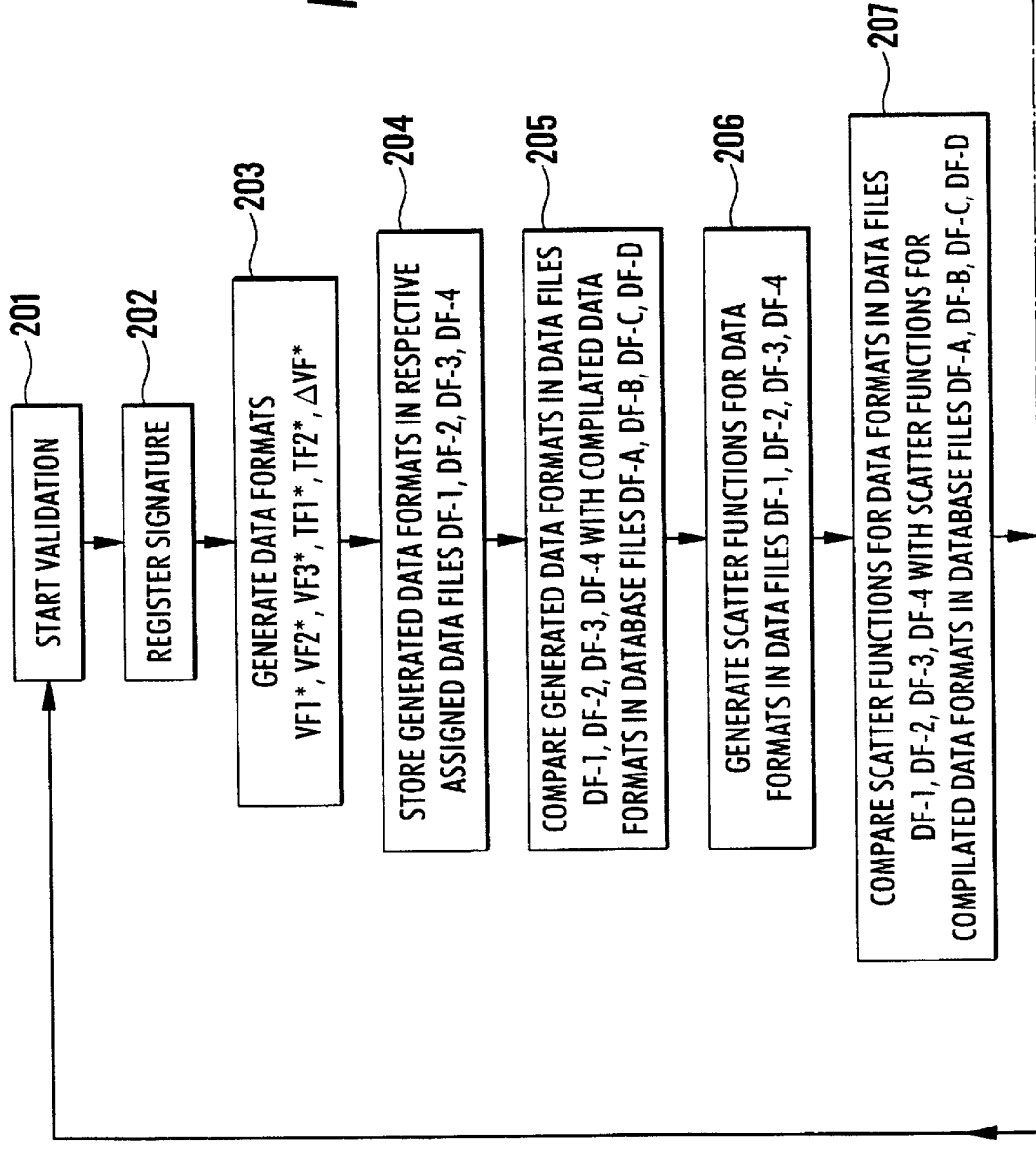

METHODS AND DEVICE FOR VALIDATING A PERSONAL SIGNATURE

FIELD OF THE INVENTION

The invention relates to a method for registration, analysis and validation of a hand-written personal signature. The invention also relates to methods for compilation of a database MDB with authenticated hand-written personal signatures which are used for validation of the authenticity of newly registered corresponding personal signatures, wherein a registration of a signature is executed a repeated number of times on a writing surface substantially defined in an x, y plane by means of a writing device which at one end has provided a writing tip for contact with said writing surface and further comprises a multi-axis movement detector, wherein the registration comprises steps for detecting the movement of said writing device as a function of time and with six degrees of freedom. Said six degrees of freedom being given by a linear movement along an x axis, a y axis and a z axis respectively as well as by rotation about said x axis, said y axis and said z axis respectively, generating on the basis of the detected movement of said writing device respectively a first data stream D1 for the movement for said writing device with only two degrees of freedom as a function of time (2-dimensional tracking). These two degrees of freedoms being given by the linear movement along said x axis and the linear movement along said y axis. A second data stream D2 for the movement of said writing device with all six degrees of freedom as functions of time (6-dimensional tracking). A third data stream D3 for the contact of said writing device with said writing surface, at said writing tip, as a function of time, and a fourth data stream D4 for a clock function. The clock function provides a time scale whereto the detection of the movement and the three first data streams D1, D2, D3 are referred, and transmitting sad data streams D1, D2, D3, D4 to a data processing device connected with said writing device. Further the invention relates to a method for validation of a hand-written signature wherein a method according to claim 1 is used for registration of the signature, the detection of the movement of a writing device and generation of a first data stream D1 for the movement of said writing device with two degrees of freedom, a second data stream D2 for the movement of the writing device with six degrees of freedom, a third data stream D3 for the contact of said writing device with a writing surface and a fourth data stream D4 for a clock function, wherein said data streams D1, D2, D3 and D4 are delivered as input data to a data processing device, wherein said data processing device contains a main database MDB for storage of registered signatures in predetermined data formats and compiled according to claims 5 or 6 and wherein the validation takes place by comparing a newly registered personal signature with a representation of an authorised personal signature already stored in said database MDB in database files DF-A, DF-B, DF-C and DF-D. Finally, the invention relates to an electronic writing device, particularly an electronic pen for use as stated above, wherein the writing device at a first end has provided a writing tip for writing on a writing surface.

DESCRIPTION OF THE RELATED ART

In the prior art there are known methods for verification and validation of personal hand-written signatures by using for instance pattern recognition in two dimensions. Such 2-dimensional validation methods for personal signatures have, however, an uncertainty which among others is determined by the fact that the pattern a personal signature forms in two dimensions will vary each time the signature is written and this uncertainty is sufficiently large that the validation method based on 2-dimensional pattern recognition not always with certainty may decide whether a genuine or forged signature is present. An accomplished forger will as a rule be able to imitate the signature pattern in two dimensions, such that possible deviations will fall within the tolerance of the validation and the forgery hence not be exposed.

In order to obviate this disadvantage it has been proposed either to register forces which occur during writing of hand-written personal signature or to register accelerations and pressures which occur during the registration of the signature.

U.S. Pat. No. 4,040,012 (Crane & al.) discloses for instance a method and apparatus wherein the identification of a test signature is obtained by comparing the test signature with a formerly registered and verified signature. The comparison comprises registering both for the test signature and the verified signature signals which represent forces in three directions when these signatures are generated. In practice the vertical normal force on the writing surface is registered as pressure in addition to force components for respectively an x and a y direction in the plane of the writing surface. The registered test signature's signals are divided into two equal parts and repeated comparisons are made between these, first without displacement and then with relative displacement and thereafter by increasing the mutual relative length of the parts and then finally by reducing the mutual relative length of the parts, whereupon the highest correlation values are found for all comparisons. These are combined and compared with a reference. The validation and the verification of the test signature in this case become a relatively complicated process, which demands a correspondingly complicated specially designed apparatus in order to be realized.

Further there is from GB patent application 2011693 (Herbst & Liu) known an apparatus for verifying a signature, wherein a pen which represents accelerations in the x and y directions and further delivers pressure signals to analog/digital converters which feed the signals to respective signature comparator units, is used. The validation of a signature takes place by comparing segments of the signals from the pen with corresponding segments of the signals from a template signature and the comparison is used in a decision device which rejects or accepts the signature.

The methods of signature verification as disclosed in the above documents are, however, also encumbered with a number of disadvantages. It has in fact turned out that dynamic parameters such as writing pressure, the acceleration of the writing device and the tilt of the writing device vary in a random and unpredictable manner with the position of the person who writes the signature and position of the writing surface in relation to this person. In order for the signature to be validated in a simple and reliable manner, methods which use the above-mentioned dynamic parameters hence must presuppose that the signature is written under approximately wholly similar circumstances each time it is registered for validation. This will make it difficult to provide a method for validation of a personal signature and which may be used in different environments, as the writing position may vary from environment to environment.

A closer investigation of how personal signatures are written has, however, shown that even if the signature pattern of a forged signature in two dimensions may be a very good imitation of the signature, there is a great difference between the writing movement proper which generates the genuine signature and the imitated signature. Further the writing movement proper is to a small degree influenced by the position of the person who writes the signature and the position of the writing surface in relation to this person.

Within a certain approximation the writing movement may be regarded as a chaotic process such that one and the same signature never will lead to two exactly similar signature regarded by their writing pattern in two dimensions, as there will always be present small variations in the hand movement and the muscle activity which are necessary to generate the signature. Yet the hand movement and the muscle activity as a function of time and within given limits will be unique for one and the same person and differ from the hand movement and the muscle activity of a forger who tries to imitate the signature. This implies that if a forged signature apparently resembles the genuine signature, the hand movement and the muscle activity which generates the imitated signature is quite different from the hand movement or the muscle activity of the person the signature in fact belongs to. If the hand movement and the muscle activity are regarded as an approximately chaotic process said, or pseudo chaotic process with more than two degrees of freedom, it can be said that the variations in the personal signature written by one and the same person has a so-called "strange attractor" which is determined by the unique biodynamic and neurological conditions which are present in the person who generates the signature. Even under stress this will be the case. An accomplished forger who tries to imitate the signature in two dimensions will, however, not have the possibility of simulating the movement parameters with several degrees of freedom, i.e. as a result of the hand movement and the muscle activity which generate the signature.

This implies that the signature is built up from movement patterns which to a certain degree has a chaotic course, but which are generated on one and the same strange attractor for one and the same person and this strange attractor cannot be simulated by a forger.

SUMMARY OF THE INVENTION

It is thus the object of the present invention to exploit this fact and for registration, analysis and validation of a handwritten signature to provide a method which avoids the disadvantages of the known validation methods and which gives a high degree of security. Still it is a further object of the invention to provide methods for compilation of a database which may be used in a validation of a signature and to employ the information of the database for validation of a personal signature. Finally it is the object of the present invention to provide an electronic writing device which is suited for realization of the invention and when used for registration of personal signature provides the information which is necessary in order to compile and validate the signature.

The above-mentioned and other objects are achieved according to the invention with a method which is characterized by registering the signature on a writing surface substantially defined in an x,y plane by means of a writing device which at one end has provided a writing tip for contact with said writing surface and further comprises a multiaxis movement detector, detecting the movement of said writing device as function of time and with six degrees of freedom, said six degrees of freedom given by a linear movement along an x axis, a y axis and a z axis respectively, as well as rotation about said x axis, said y axis and said z axis respectively, generating on basis of the detected movement of said writing device respectively a first data stream D1 for the movement of said writing device with only two degrees of freedom as function of time (2-dimensional tracking), said two degrees of freedom given by the linear movement along said x-axis and the linear movement along said y axis, a second data stream D2 for the movement of said writing device with all six degrees of freedom as function of time (6-dimensional tracking), a third data stream D3 for the contact of said writing device with said writing surface at said writing tip as function of time and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device for analysis and storage of the registered signature in a database, transforming said data streams D1, D2, D3, D4 in said data processing device into predetermined formats which represent a personal signature and are stored in said database contained in said data processing device, said database comprising a data file for each predetermined format, and validating a newly registered personal signature by comparison with an authenticated corresponding personal signature already stored in said database; a method for compilation of a database MDB and which is characterized by registering a signature on a writing surface substantially defined in an x,y plane by means of a writing device which at one end has provided a writing tip for contact with said writing surface and further comprises a multiaxis movement detector, detecting the movement of said writing device as function of time and with six degrees of freedom, said six degrees of freedom given by a linear movement along an x axis, a y axis and a z axis respectively as well as by rotation about said x axis, said, y axis and said z axis respectively, generating on the basis of the detected movement of said writing device respectively a first data stream D1 for the movement of said writing device with only two degrees of freedom as function of time (2-dimensional tracking), said two degrees of freedom given by the linear movement along said x axis and the linear movement along said y axis, a second data stream D2 for the movement of said writing device with all six degrees of freedom as function of time (6-dimensional tracking), a third data stream D3 for the contact of said writing device with said writing surface at said writing tip as function of time and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device, transforming data from said first data stream D1 into a 2-dimensional vector format VF1 which is stored in a first database file DF-A, transforming data from said second data stream D2 into a 3-dimensional vector format VF2 which is stored in a second database file DF-B, transforming data from said third data stream D3 into a table format TF1 which is stored in a third database file DF-C and transforming data from said fourth data stream D4 into a start/stop point of time format and a time duration format TF2 which are stored in a fourth database file DF-D, said database files DF-A, DF-B, DF-C, DF-D being contained in the database MDB which is stored in said data processing device or a possible further central data processing device; or a method for compilation of a database MDB and which is characterized by registering the signature a repeated number of times on a writing surface substantially defined in an x,y plane by means of a writing device which at one end has provided a writing tip for contact with said writing surface and further comprises a multiaxis movement detector, detecting the movement of said writing device as function of time and with six degrees of freedom, said six degrees of freedom given by a linear movement along an x axis, a y axis and a z axis respectively as well as by rotation about said x axis, said y axis and said z axis respectively, generating on basis of the detected movement of said writing device respectively a first data stream D1 for the movement for said writing device with only two degrees of freedom as function of time (2-dimensional tracking), said two degrees of freedom given by the linear movement along said x axis and the linear movement along said y axis, a second data stream D2 for the movement of said writing device with all six degrees of freedom as function of time (6-dimensional tracking), a third data stream D3 for the contact of said writing device with said writing surface at said writing tip as function of time, and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device, transforming data from said first data stream D1 into a 2-dimensional vector format VF1 which is stored in a first database file DF-A, transforming data from said second data stream into a 3-dimensional vector format VF2 which is stored in a second database file DF-B, transforming data from said third data stream D3 into a table format TF1 which is stored in a third database file DF-C and transforming data from said fourth data stream D4 into a start/stop point of time format and a time duration format TF2 which are stored in a fourth database file DF-D, said database files DF-A, DF-B, DF-C and DF-D being contained in the database MDB which is stored in said data processing device and a possible further central data processing device, generating said 2-dimensional vector format VF1, said 3-dimensional vector format VF2, said table format TF1 and said start/stop point of time format and time duration format TF2 as respective average formats with an upper and lower tolerance limit, said upper and lower tolerance limits being determined on the basis of scatter values for repeated registrations of the personal signature and related to said respective average format, and for each format as function of time generating a scatter function on the basis of scatter values for the format, said average formats with the accompanying tolerance limits and scatter functions being stored in said database files DF-A, DF-B, DF-C and D respectively; as well as a method for validation of a hand-written personal signature and which is characterized by the method comprising transforming data from the first data stream D1 into a 2-dimensional vector format VF1* which is stored in a first data file DF1, optionally further transforming data from the second data stream D2 into a virtual 2-dimensional signature on vector format VF3 * which is also stored in said first data file DF-1, transforming data from the second data stream D2 into a 3-dimensional vector format VF2* which is stored in a second data file DF-2, transforming data from the third data stream D3 into a table format VF1* which is stored in a third data file DF-3, transforming data from the fourth data stream DF-4 into a start/stop point of time format and time duration format TF2* which are stored in a fourth data file DF-4 and thereafter comparing data of said data file DF-1 with data of said database file DF-A, said comparison constituting a first validation level VL1, comparing data of said data file DF-2 with data of said database file DF-B, said comparison constituting a second validation level VL2, comparing data of said data file DF3 with data of said database file DF-B, said comparison constituting a third validation level VL3, comparing the data of said data file DF-4 with data of said database file DF-D, said comparison constituting a fourth validation level VL4, generating a scatter function for each of the data formats stored in one of said data files DF-1, DE-2, DF-3, DF-4 on the basis of the result of comparisons on the respective assigned validation levels VL1, VL2, VL3, VL4, comparing said scatter function for one or more of the data formats stored in said data files DF-1, DF-2, DF-3, DF-4 with a scatter function for average data formats stored in the respective database files DF-A, DF-B, DF-C and DF-D which represent the stored and authorized corresponding signature, said comparison constituting a fifth validation level VL5, and validating the signature as authentic if and only if the result of the comparison performed on one or more of said validation levels VL1, VL2, VL3, VL4, VL5 for the four first validation levels VL1, VL2, VL3 and VL4 without exact match between the data formats in the data file and the database file falls within a predetermined upper and lower tolerance limit of each of these validation levels and the result of the comparison on the fifth validation level VL5 provides a positive correlation for this validation level above a given lower limit of the correlation value.

An electronic writing device for use with the invention is characterized by the writing device comprising a detector for detection of a writing movement respectively as x,y,z coordinates of said detector in a suitable frame of reference and as a rotation of said detector about one of the axes x,y,z in the same frame of reference, a transmitter device connected with said detector for transmission of the detected data on a communication line to a data processing device, and a microswitch provided at the writing tip for detection of the contact of said writing tip with the writing surface, said microswitch being activated respectively by the contact of said writing tip with said writing surface and the cessation of the contact of said writing tip with said writing surface.

In the method for registration, analysis and validation of a personal signature it is according to the invention advantageous that a pressure sensitive display device is used as a writing surface and that the first data stream D1 is generated by said pressure sensitive display device by the contact of the writing tip with said writing surface and represents the signature's 2-dimensional pattern in the x,y plane formed by said writing surface, said 2-dimensional pattern under registration being visualized by said display device.

In the methods for compilation of a database it is according to the invention advantageous that a pressure sensitive display device is used as a writing surface, that the first data stream D1 is generated by said pressure sensitive display device by the contact of the writing tip with said writing surface and represents the 2-dimensional pattern of the signature in the x,y plane formed by said writing surface, that the data from the second data stream D2 is transformed into a virtual 2-dimensional signature on a vector format VF3, the vector format VF1 for said first data stream D1 and said vector format VF3 for said virtual 2-dimensional signature both being stored in the database file DF-A, and that a differential vector format ΔVF which likewise is stored in said database file DF-A is generated from said vector format VF1 for the first data stream D1 and said vector format VF3 for said virtual 2-dimensional signature.

In the method for validation of personal signature it is according to the invention advantageous that data from the second datastream D2 are transformed into the virtual 2-dimensional signature by replaying the data as an animation sequence, and that the signature is registered as written by a 2-dimensional virtual writing device.

In the method for validation wherein average formats with an upper and lower tolerance limit are generated in a compilation of a database and a scatter function for each format is generated on the basis of the scatter values for the format, it is according to the invention advantageous that a differential vector format ΔVF* which likewise is stored in the date file DF-1 is generated from the vector format VF1* for the first data stream D1 and the vector format VF3* for the virtual 2-dimensional signature and that said differential vector format ΔVF* in said data file DF-1 is compared with the differential vector format ΔVF in the database file DF-A in the validation on the validation level VF1. Finally it is in the method for validation of personal signature according to the invention advantageous that the validation level VL2 is used together with the validation level VL5 for maximum security.

Further it is in the electronic writing device according to the invention advantageous that the detector is a 3-axis accelerometer with six degrees of freedom, said accelerometer being assigned preferably to an orthogonal 3-dimensional frame of reference, and likewise advantageous that the writing device comprises a pressure sensor for detection of a writing pressure and/or a temperature sensor connected with the detector and optionally also with said pressure sensor for use in compensation of temperature dependent variations in the sensitivity of said detector or said pressure sensor.

Further features and advantages of the invention are disclosed by the remaining appended dependent claims.

BRIEF DESCRIPTION OF THE DRAWINGS

The invention shall now be further explained with reference to exemplary embodiments taken in connection with the accompanying drawings, wherein.

DETAILED DESCRIPTION OF THE PREFERRED EMBODIMENT

Figure 1:
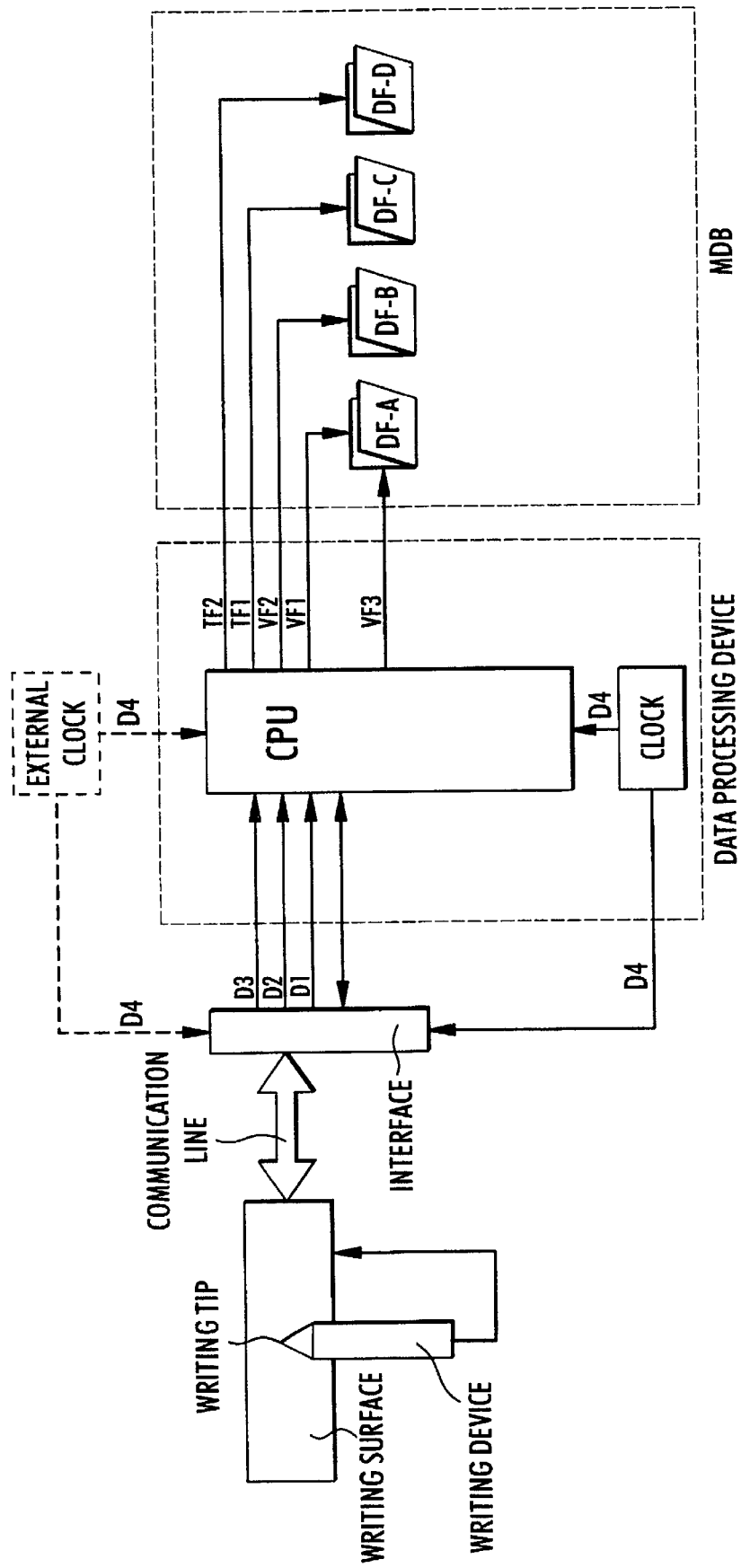
FIG. 1 shows schematically and in block diagram form a preferred embodiment of the registration and compilation of a personal signature according to the present invention.

A preferred embodiment of the method for the registration and compilation of an authenticated personal signature is shown in schematic block diagram form in FIG. 1. As evident form this figure the registration and compilation comprise substantially three process steps. In the first process step at left in FIG. 1 the signature is registered with a writing device, for instance the electronic writing device and electronic pen according to the present invention and which shall be discussed in more detail later. The registration takes place by moving the writing tip of the writing device over a writing surface which substantially is defined in an x,y plane. Preferably according to the invention a pressure sensitive display device is used as writing surface, such that the 2-dimensional pattern of the signature during the registration appears on the display device and is visualized for the user, while the contact of the writing tip against the writing surface via not shown electric contact means simultaneously generate x,y-signals which correspond to the movement of the writing tip in the x,y directions on the writing surface. The contact between the writing tip of the writing device and the writing surface can be registered in the writing surface by the electrical contact formed, but the writing tip may also be designed as a microswitch for the detection of the contact with the writing surface, such that this detection takes place in the writing device itself.

In the writing device there is for instance at the opposite end from the writing tip provided a multiaxis movement detector such that the movement of the writing device is detected with six degrees of freedom given by a linear movement along an x axis, a y axis and a z axis respectively as well as by rotation around the x axis, the y axis and the z axis respectively. The signals from the writing device are preferably transferred to the writing surface or the pressure sensitive display device and are transmitted together with the signals detected in the latter for the x,y movement of the writing tip via not shown detection and communication circuits provided in the pressure sensitive device and over a communication line to an interface.

This interface may preferably be a sampling digital/analog converter which generates three data streams D1, D2, D3, the generation of the data streams constituting the second process step.

The first data stream D1 gives the movement of the writing device in the x,y plane, i.e. the movement of the writing tip on the writing surface as function of time, this movement having two degrees of freedom only and corresponding to a two-dimensional tracking. These two degrees of freedom are as mentioned given by a linear movement of the writing tip along respectively the x axis and the y axis on the writing surface. A second data stream for the movement of the writing device with all six degrees of freedom is detected by the not shown multiaxis movement detector in the writing device and comprises all six degrees of freedom as a function of time, which corresponds to a 6-dimensional tracking. A third data stream D3 for the contact of the writing device with the writing surface via the writing tip is generated as function of time, preferably by means of a microswitch in the writing tip, but possibly also by a detection in the pressure sensitive display device itself. The data stream D3 will thus indicate whether the writing tip is contacting the writing surface and the duration of a contact of this kind. Further the interface with the sampling digital/analog converter receives a fourth data stream D4 for a clock function. The clock function provides the time scale for the movement detection and a time reference for the three data streams D1, D2, D3.

Data are transmitted from a writing device to the interface or a sampling digital/analog converter with a predetermined rate. The communication line used may either be a wireless communication line or a cable-based communication line. The not shown communication circuits provided in the writing surface or the pressure sensitive display device will in any case be adapted to the communication mode used.

The interface of the sampling D/A-converter constitutes the input interface to a data processing device and delivers data streams D1, D2, D3 in the form of digital signal sequences to the central processor CPU in the data processing device, wherein the third process step takes place. The clock may be provided in the data processing device and deliver the digitalized data stream D4 directly thereto. However, there is nothing to prevent the clock function being generated by an external clock, as it is indicated in FIG. 1. The data streams D1, D2, D3, D4 are analysed and processed in the data processing device for compilation and storage of predetermined data formats which represent a personal signature, in database files DF-A, DF-B, DF-C, DF-D in a date base MDB which may well be stored in the data processing device, but not necessarily. When this is done, the validation of a newly registered personal signature may take place by the comparison with an already in the database MDB compiled and stored representation of the corresponding authenticated registered signature.

The sampling of the registered movement of the writing device should take place with a rate of over 100 Hz, and a preferred rate may for instance be between 100 Hz and 1 kHz. When a personal signature shall be validated, this must take place against testing of an already registered personal signature which is compiled into formats representing the personal signature and which are compared with corresponding formats generated from a newly registered personal signature.

Figure 2:
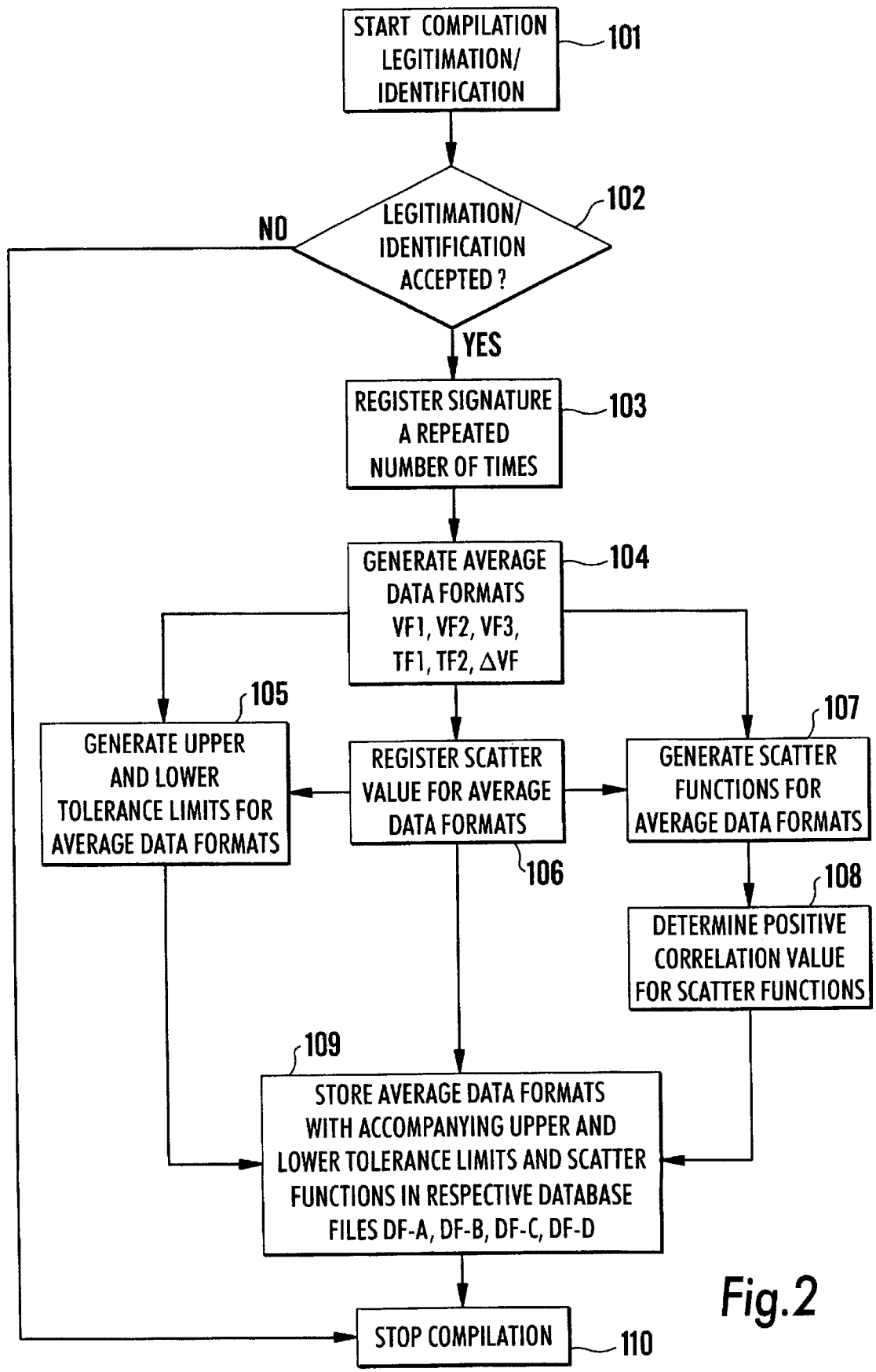
FIG. 2 a flow diagram of the embodiment in FIG. 1.

A preferred method used for the compilation of the database MDB as shown in FIG. 1, is illustrated in flow diagram form in FIG. 2 and shall now be discussed in more detail in connection therewith.

Upon starting the compilation in step 101 the user, i.e. the person whose signature is to be compiled and later validated, identifies and legitimates his identity. If the identification documents are satisfying and the identification accepted in step 101, the user registers his signature a repeated number of times with the writing device on the writing surface in step 103. If not, the process proceeds from step 102 to step 109 and the compilation is stopped.

In the compilation the signature is registered a repeated number of times in step 103. The data from the first data stream D1 are transformed into a 2-dimensional vector format VF1 which is stored in the first database file DF-A. The data from the second data stream D2 are transformed into a 3-dimensional vector format VF2 which is stored in a second database file DF-B. Further the vector format VF2 is used generating the vector format VF3 which together with the vector format VF1 are used for generating a differential vector format $\Delta$VF. The generation of the vector format VF3 and the vector format $\Delta$VF shall additionally be more closely discussed in the following. The data from the third data stream D3 are transformed into a table format TF1 which is stored in the third database file DF-C. The data from the fourth data stream D4 are transformed into a combined start/stop point of time format and time duration format TF2 which is stored in the fourth database file DF-D. Thereafter average data formats VF1, VF2, VF3, TF1, TF2, $\Delta$VF are generated in step 104.

On the basis of the repeatedly registered signatures the scatter values for the average data formats are further registered in step 106, viz. of the vector formats VF1, VF2, VF3, $\Delta$VF as well as table formats TF1, TF2. By using the average generated data formats in the database MDB upper and lower tolerance limits for each average data format are now generated in step 105, the scatter values for these as registered in step 106 simultaneously being used. The scatter values registered in step 106 are also used in the data processing device together with the average data formats VF1, VF2, VF3, TF1, TF2, $\Delta$VF to generate in step 107 scatter functions for the above-mentioned average data formats. As is to be discussed more closely in the following, the generated scatter functions for the average data formats may be used in the validation together with the scatter functions for the generated data formats of a newly registered signature, preferably such that the correlation between the scatter function of compiled data formats shall have a positive correlation with the scatter function for the data formats of a newly registered signature. Hence there is in step 108 determined a minimum positive correlation value for correlation between the compiled and the newly registered data formats. In step 109 both the average data formats, the accompanying upper and lower tolerance limits and the scatter functions are stored in the respective database files DF-A, DF-B, DF-C, DF-C. The compilation of a database which contains the average formats which represent an authenticated signature is now completed and the compilation stops in step 110.

In the determination of the upper and lower tolerance limits for average data formats different statistical analysis methods may be used. The same will also be the case in the generation of the scatter functions for the average data formats. It will also be possible to employ other criteria than correlation for a significant covariance between the compiled scatter functions and the scatter functions for the newly registered data formats.

When a pressure sensitive display device is used for registration of the signature, the first data stream D1 is generated by the pressure sensitive display device by the contact of the writing tip with the writing surface and represents a 2-dimensional pattern of the signature in the x,y plane formed by the writing surface. A vector format generated from the first data stream D1 will hence be the vector format VF1 which represents the 2-dimensional signature. The data from the second data stream D2 may in addition to the transformation into the 3-dimensional vector format VF2 which is stored in the second database file DF-B, also be transformed into a virtual 2-dimensional signature on the vector format VF3. Both the vector format VF1 for the first data stream D1 and the vector format VF3 for the virtual 2-dimensional signature are stored in the first database file DF-A. In the data processing device the differential vector format $\Delta$VF is now generated for instance as the difference between the vector format VF1 and the vector format VF2 and this virtual vector format $\Delta$VF is likewise stored in the database file DF-A, optionally with accompanying scatter values, upper and lower tolerance limits and scatter function.

There may for the compilation be used a local data processing device provided in connection with a user location, or a central data processing device which may be accessed from a number of user locations. The database MDB and of course also the data processing device must in any case be secured against unauthorised access. Such security measures for the data processing device and the database MDB may be specific for applications which require validation of a personal signature.

Preferably the third database file DF-C and the fourth database file DF-D respectively are encrypted in ASCII code.

It shall be understood that it will be possible to provide a 2-dimensional registration of a signature, i.e. as a pattern in an x,y plane by conventional scanning, for instance by the person whose signature is to be registered and compiled writing the signature on a surface, for instance paper, using a common writing device, for instance a pencil or a pen. This 2-dimensional signature might thereafter be scanned into the data processing device by using a surface scanner and registered in 2-dimensional raster format by the scanner used being a raster scanner. The raster format hence substantially corresponds to the data stream D1 as delivered to the data processing device. The raster format must in any case be transformed to the vector format VF1 in a raster/vector translator and stored as a 2-dimensional vector format VF1 in the first database file DF-A. The use of conventional scanning of the signature in order to find its 2-dimensional pattern is, however, an unnecessary and cost-increasing intermediate stage which further requires the use of additional equipment. By using the pressure sensitive display device as mentioned above, the 2-dimensional vector format VF1 can rather more expedient be generated directly from the data stream D1 in the data processing device.

After the database MDB has been compiled with the database files DF-A, DF-B DF-C and DF-D and the assigned respective vector formats VF1, VF3, ΔVF, VF2; TF1, TF2, these vectors format may be used for validating a newly registered personal signature in the data processing device. The validation itself is shown in schematic block diagram form in FIG. 3 and comprises similarly to the registration and compilation substantially three process steps.

Figure 3:
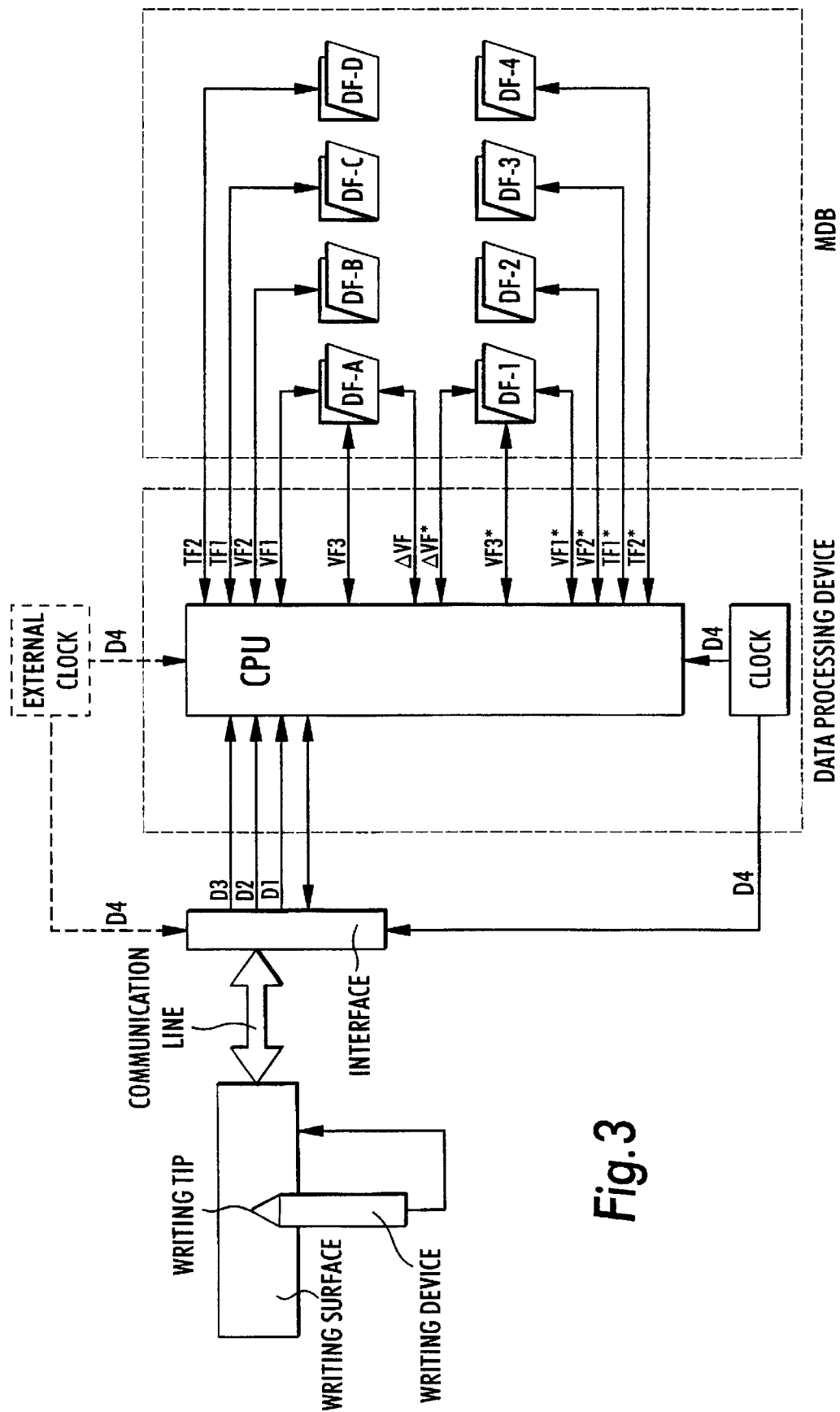
FIG. 3 schematically and in block diagram form a preferred embodiment of the registration and validation of a personal signature according to the present invention.
Figure 4:
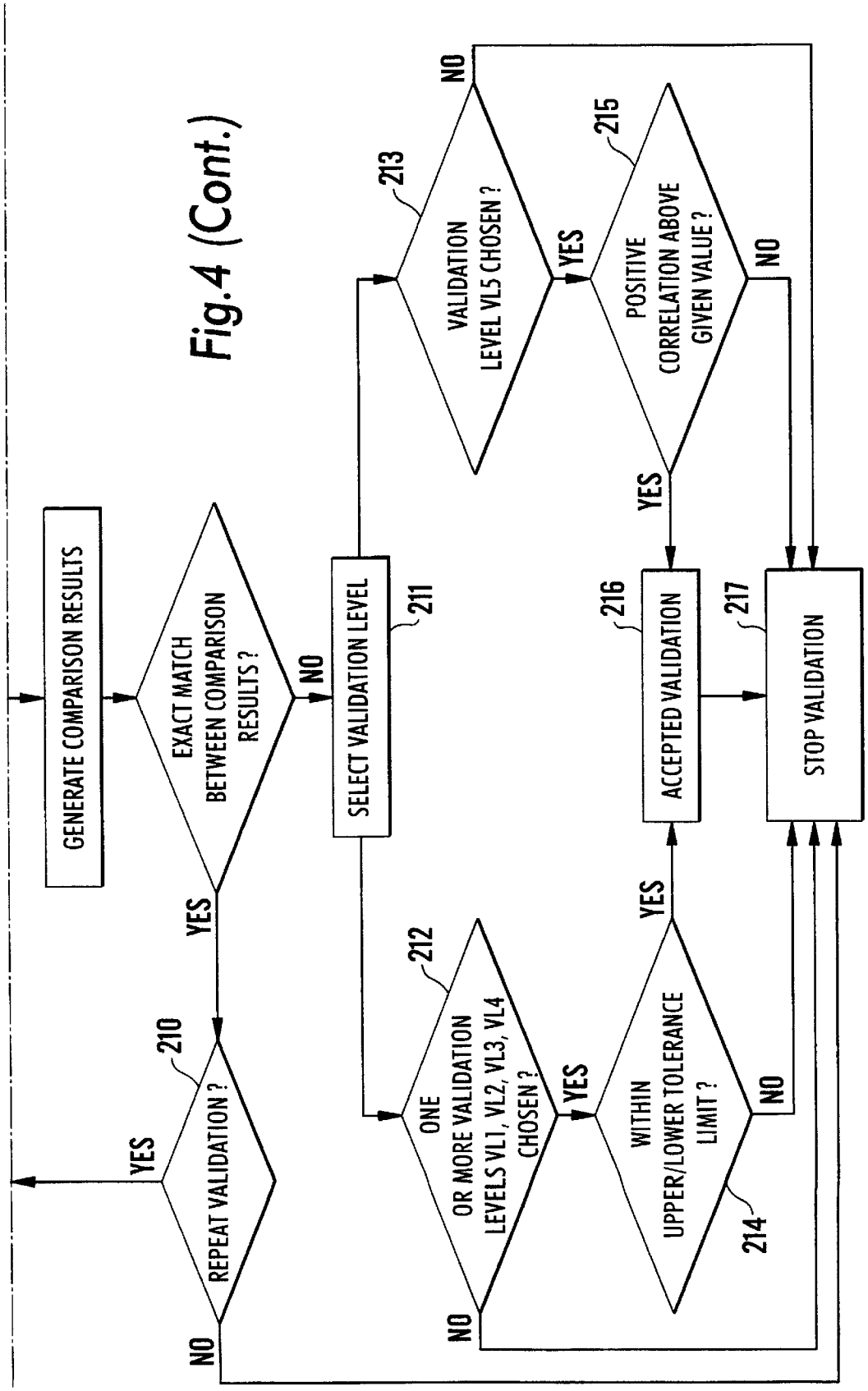
FIG. 4 a flow diagram of the embodiment in FIG. 3.

With reference to FIG. 3 and 4 there shall now be discussed a preferred embodiment of a method for validation of a personal signature which is written with a suitable writing device, for instance the writing device according to the present invention. As is the case with the registration and compilation as shown in FIGS. 1 and 2, the validation process substantially comprises three separate process steps.

In the first process step the hand-written signature which is to be authenticated is written on a writing surface with a suitable writing device which is connected to the writing surface, both the writing surface and the writing device via a communication line being connected with an interface to a data processing device. The signals from the writing device and the writing surface is transmitted over the communication line to the interface which comprises a sampling digital/analog converter and therein are, as in the case of the compilation, three data streams D1, D2, D3 are generated, the interface also receiving the data stream D4 for the clock function. The latter can as before be delivered from a clock in the data processing device or optionally from an external clock and will also constitute the clock function for the writing device and the writing surface by via the interface line being transmitted to not shown control and communication circuits which preferably are provided at the writing surface. Suitably and for most purposes the writing surface will be a pressure sensitive display device, such that the movement of the writing device both generates the data stream D1 for the movement of the writing tip with two degrees of freedom in the x,y plane and simultaneously provides the user a visual indication of the written signature.

The data streams D1, D2, D3, D4 are transformed in the central processor CPU of the data processing device into suitable formats for a storage in the data files DF-1, DF-2, DF-3, DF-4 in the database MDB which may be contained in the data processing device.

Hence, in the validation the first data stream D1 is transformed into a 2-dimensional vector format VF1 * which is stored in the first data file DF-1. Optionally data from the second data stream D2 now further are transformed into a virtual 2-dimensional signature on vector format VF3 * which also is stored in the first data file DF-1. The second data stream D2 is transformed into a 3-dimensional vector format VF2* which is stored in the second data file DF-2 and data from the third data stream D3 are transformed into a table format TF1 * and stored in the third data file DF-3, while data from the fourth data stream D4, i.e. the clock function, are transformed into a start/stop point of time format and a time duration format TF2* which are stored in the fourth data file DF-4. The vector formats VF1* and VF3 * are further used for generating a differential vector format ΔVF*.

The first process step in the validation hence consists in generating the data streams and the second process step in transforming the data streams into suitable data formats for storage in the respective data files. In other words, the method of the validation is so far similar to that of the registration and compilation of the authenticated and already stored signature.

FIG. 4 shows a flow diagram of the validation process. In step 201 validation starts and in step 202 the signature is registered and the data streams generated. In step 203 the above-mentioned data formats are generated in the data processing device and they are stored in step 204 in the respective assigned data files, as already mentioned.

The third process step, the validation proper, now starts in step 205 and begins with comparing the generated data formats in the data files DF-1, DF-2, DF-3, DF-4 with the already compiled average data formats VF1, VF2, VF3, TF1, TF2, ΔVF which respectively are stored in the database files DF-A, DF-B, DF-C, DF-D. These compiled data formats constitutes an average of repeated registrations of the already authenticated signature. By comparing the data formats which represent the signature which is to be validated with corresponding data formats in the database files, a comparison result 208 will be generated, wherein the deviation between the newly registered signature which is to be validated and an already authenticated signature appears.

The comparison of the generated data formats in the data files DF-1, DF-2, DF-3, DF-4 with the already compiled data formats in the database files will also make it possible to generate the scatter functions for the data formats VF1*, VF2*, VF3*, TF1*, TF2*, ΔVF*. These scatter functions may suitably be generated by using the resulting scatter values of the time varying deviation between the generated data formats in the data files and the authenticated data formats in the database files.

In step 207 hence the scatter functions for the data formats in the data files are compared with the scatter functions for compiled formats in the database files and the result of the comparison is given to step 208 which generates the comparison results. These comparison results will now consist of respectively the scatter values and the scatter functions for data formats in the data files.

The result of the comparison of data in the data file DF-1 with data in the database file DF-A constitutes a first validation level VL1, the result of the comparison of data in the data file DF-2 with the data in the database file DF-B a second validation level VL2, the result of the comparison of data in the data file DF-3 with data in the database file DF-C a third validation level VL3, the result of the comparison of data in data file DF4 with data in the database file DF-D a fourth validation level VL4 and finally the comparison of the scatter functions for each of the data formats stored in the data files DF-1, DF-2, DF-3, DF-4 with the scatter functions for the average and corresponding data formats stored in the database files DF-A, DF-B, DF-C and DF-D constitutes a fifth validation level.

The validation process continues in decision step 209 with an investigation of whether there is present an exact match between the comparison results, i.e. that the scatter values and hence also the scatter function equal 0. In that case this implies that those data formats which represent a personal signature to be validated, are identical to the average and already stored authenticated data formats in the database files. Due to reasons which are mentioned already in the introduction of the application, this will however, never occur with a handwritten personal signature and an exact match hence indicates that something is wrong, for instance due to someone having copied authenticated data formats and sent a false data stream over the communication line to the interface and the data processing device. Is thus an exact match present, the validation may by a decision in decision step 210 be repeated. Should the result in 209 again be the same, namely that an exact match was present, this would substantiate the suspicion that something is wrong and the validation is interrupted via the decision step 210. If, however, the comparison results provide no exact match, the process proceeds to step 211 wherein it will be possible to choose the validation level. There is, however, nothing to prevent one or more validation levels being default and adapted to the application. Step 211 implies that a default validation may be overruled either by a suitable system implementation or by a decision from the operator. If, however, one or more of the validation levels now are chosen either as default or for the occasion, the validation process proceeds to step 212 if one or more of the validation levels VL1, VL2, VL3, VL4 are chosen or to step 213 if the validation level VL5 has been chosen. In the first case the validation process proceeds to decision step 214 wherein it is tested whether the result of the comparison lies within the upper and lower tolerance limit for the validation level or levels in question. If yes, the process proceeds to step 216 and the validation is accepted, where after the process stops in step 217. If the answer is no, the process proceeds to step 217 and is stopped. If the validation level VL5 is chosen, the process proceeds to decision step 215, wherein there is tested whether the scatter function for the registered signature which is to be validated, correlates positively with a corresponding scatter function for one or more of the data formats in the database files. If the correlation is positive and lies above a predetermined value, the validation is accepted in step 216 and the process stops in step 217.

In case no validation level is chosen and it is impossible to chore the validation level, the process via the decision steps 212, 213 respectively move to step 217 and the validation stops.

Hence it will be seen that the method according to the invention validates a signature as authentic if and only if the result of the comparison performed on one or more of the validation levels VL1, VL2, VL3, VL4, VL5 for the four first validation levels VL1, VL2, VL3, VL4 falls within a tolerance range which has been previously determined for each of these validation levels and that of course without an exact match between the formats used in respectively the data files and the database files being present. If the validation level VL5 is used, there shall further be present a positive correlation between the scatter function for a chosen format in one of the data files and the scatter function for the corresponding average format in one of the database files. The requirement for the validation to be accepted and the signature regarded as authentic, shall in this case be regarded as met if the positive correlation lies above a lower limit for the predetermined correlation value.

As also in the compilation of the database files the transformation of data from a second data stream D2 into a virtual 2-dimensional signature may take place by the z component and the rotation component about the x,y and z axis respectively being set equal to 0. In practice this can take place by replaying the resulting data as an animation sequence and generating the accompanying vector format VF3 * for storage in the first data file as if it were written by 2-dimensional virtual writing device. In the comparison on the validation level VL1 the 2-dimensional vector format VF1 * may then be compared with the 2-dimensional vector format VF1 or the virtual 2-dimensional format VF3 be compared with the virtual 2-dimensional compiled vector format VF3. Both comparisons may also be used on validation level VL1. Neither is there anything against for instance the vector format VF3 * being compared with the compiled vector format VF1. In both cases the comparison shall concern signatures registered in the x,y dimension with two degrees of freedom. In this case it would be preferable in the validation of a personal signature, given that a differential vector format $\Delta VF$ is generated during the compilation of the database files as the difference between the vector format VF3 for the virtual 2-dimensional signature and the vector format VF1 generated from the first data stream D1, that a differential vector format $\Delta VF^*$ which also is stored in the data file DF-1 is generated from the vector format VF1* and the vector format VF3 * for the virtual 2-dimensional signature. In the validation on validation level VL1 the differential vector format $\Delta VF^*$ in the data file DF-1 is now compared with the differential vector format $\Delta VF$ and the accompanying tolerance limits as they are stored in the database file DF-A.

The vector formats VF3, VF3* may be regarded as representing the movement of a virtual writing tip on a virtual writing surface. As the 3-axis movement detector and the writing tip are provided spaced apart in the writing device, preferably by the detector means being located at an end of the writing device opposite the writing tip, the virtual writing plane will be located at a distance from the real writing surface, for instance corresponding to the distance between the latter and the detector, and this distance will vary with the movement of the pen during the writing such that the virtual writing surface is not plane or parallel with the writing surface. Even if it is possible to normalize the virtual writing surface to make it plane and obtain a constant distance to real writing surface, this is not necessary, as it is the x,y position of the virtual writing tip referred to the chosen 3-axis frame of reference for the movement detector which is of interest. The point of origin in the 3-axis frame of reference may be chosen and the movement detection initialized by the detector's position at the moment the writing tip contacts the writing surface. The differential vector formats $\Delta VF$, $\Delta VF^*$ will in each case represent a vector which connects the virtual writing tip, given by the positions of the movement detector above the writing surface and the real writing tip given by the position of the writing tip of the writing surface. Simultaneously the differential vector formats $\Delta VF$, $\Delta VF^*$ also express the transformation between the movement with six degrees of freedom and the movement with two degrees of freedom, hence the 6-dimensional and the 2-dimensional tracking respectively, which makes them particularly attractive for use in the validation on the first validation level VL1.

During the validation it also will be preferable that validation on a validation level, for instance VL1, VL2, is used simultaneously with the validation level VL5. This again implies that the compiled scatter function for the respective compiled vector format is regarded together with the generated scatter function for one of the data formats in the data files DF-1 or DF-2, for instance in the first case the scatter function for the vector format ΔVF* and the second case the scatter function for the vector format VF2*.

If it is required that the validation shall take place with maximum security, it will be preferred that validation level VL2 is used together with validation level VL5, in other words that the generated data formats VF2* is compared with the compiled vector format VF2 with simultaneous use of the accompanying scatter functions for the vector format VF2* and the vector format VF2. An accepted validation implies as before that there is no exact match within the tolerance limits for the compiled vector format VF2 and that the scatter functions for the vector formats mentioned correlate positively with a value which lies above a previously given level for the correlation value.

In the present invention there will be used personal tolerance limits for each validation level, the tolerance limits being determined on the basis of scatter values for an already authenticated and compiled personal signature determined as an average of repeated signatures. It is implicated that the tolerance limits may vary on the separate validation levels and with use of several validation levels there is a very small probability that a forged signature will be possible to validate as genuine. In the validation the formats which are included on different validation levels may be regarded as a strange (pseudo-) attractor for the signature to be validated, noticeably if the signature is authentic. In practice this means that the signature that is to be validated never will coincide with the average data formats of the already compiled and authenticated signature. A signature which is to be validated will hence, with a probability which is empirically determinable, fall within upper and lower tolerance limits for the formats of the separate validation levels used in the validation. A requirement for an exact match on one of the validation levels would as a consequence cause a rejection of the signature which is to be validated. If for instance a low sampling frequency is used, it could be that the deviation, i.e. the scatter values, in some cases may be very small and that the signature which is to be validated, almost coincides with an already compiled and authenticated signature. If the writing of a hand-written signature is regarded as a chaotic process in the domain wherein the data streams are generated, an increase in the sampling rate will, however, disclose more clearly the fractality of the signature, such that the danger of an authentic signature which yet incidentally lies very close to a generated average format, will be highly improbable. Preferably sampling rates of at least some hundred hertz and up to one kHz should hence be used.

It might happen that hand-written personal signatures which are to be validated, generates data streams with more or less randomly distributed components of a transient nature, such that the requirement for match within the tolerance limits is not met in the validation. It will, however, be possible to remove transient components of this kind by suitable processing, such that the signature yet is validated as genuine. Preferably a signature which is to be validated then should be registered more than once in order to clearly distinguish the nature of the transients. It is reasonable to suppose that the cause of transients of these kind may be specific and temporary somatic or traumatic states in the person whose signature is to be validated, and in such cases it will be desirable to avoid that the result of the validation is rejected. By for instance using a cross-correlation technique on two repeated registrations of the signature, random transients may be eliminated from the validation step and the signature yet validated as authentic. If the person whose signature is to be validated is subjected to a sustained or constant stress, this will appear as regular and systematic deviation between the signature to be validated and the already authorised and authenticated signature such that the comparison result systematically lies outside the tolerance limit or the correlation between the scatter function is lower than the value which would result in an accepted validation. The deviation hence in a situation of this kind is supposed to be systematic and a repeated registration of the signature may be used to confirm this. In each case such a situation will lead to the result that the validation is rejected. Hence it is not very probable that the person which is forced to register his signature for validation, for instance for criminal purposes, shall have an accepted validation result.

Figure 5A:
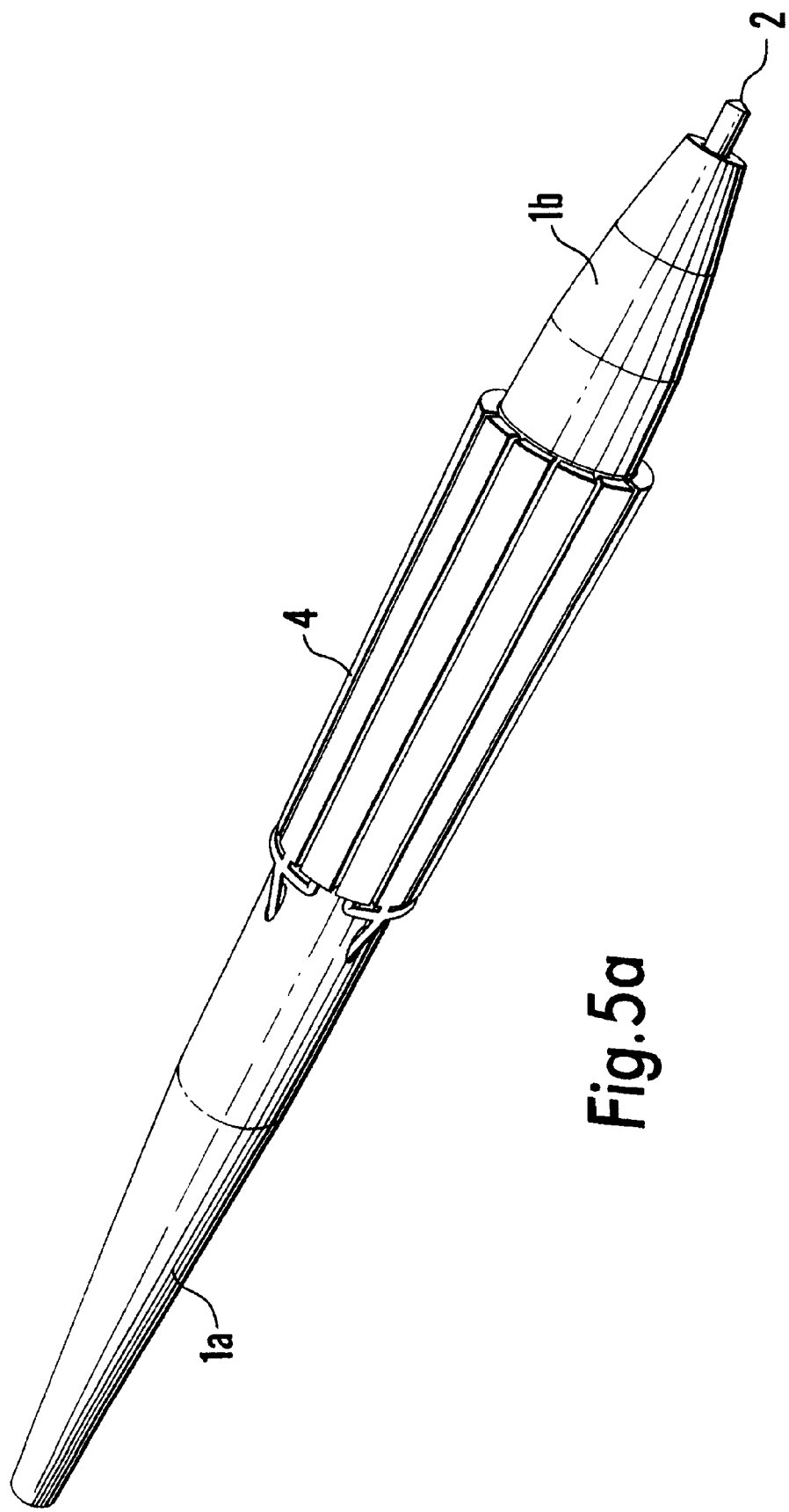
FIG. 5a a preferred embodiment of a writing device according to the present invention.

There shall now be described an electronic writing device, particularly an electronic pen for use with the methods according to the invention for registration of a personal hand-written signature on an electronic writing tablet. For instance, the writing tablet as mentioned is a pressure sensitive display device such that a hand-written signature during the registration is visualised in the display device with a simultaneous registration of the x,y components of the movement of the writing tip on the writing surface over a contact matrix. Such means are known in the art and shall hence not be further discussed herein. This electronic writing device or the electronic pen 1 is shown in FIG. 5a and exploded in its separate components in FIG. 5b and comprises a housing constituted by a body part 1a and a tip part 1b. In the tip part 1b there has been provided a writing tip 2 which when writing contacts the underlying surface, i.e. the electronic writing tablet. Spaced apart from the writing tip 2 and connected to the body part 1a of the housing a detector 3 for detecting a writing movement with six degrees of freedom has been provided. The detector 3 is connected to the body part of the housing. Further the pen comprises an optional temperature and pressure sensor 4 which is provided around the body part 1a of the housing. The detector 3 is connected with a not shown transmitter device for transmitting the detected data on a not shown communication line to a data processing device and with a microswitch 5 provided in the body part 1a of the housing for detection of the contact of the writing tip with the underlying surface.

The detector 3 is preferably a 3-axis accelerometer with six degrees of freedom and likewise preferably assigned to an orthogonal 3-dimensional frame of reference. Due to the writing movement of the pen 1 the detector will detect a movement of the writing tip with six degrees of freedom. Further the detector 3 is connected with a clock (not shown) which provides a timing control for the detection and a time scale for the detected movement for the writing tip 2. The clock may, however, preferably be the same as in FIG. 1 or 3 and the clock function is then transmitted to the writing device on the two-way communication line.

Figure 5B:
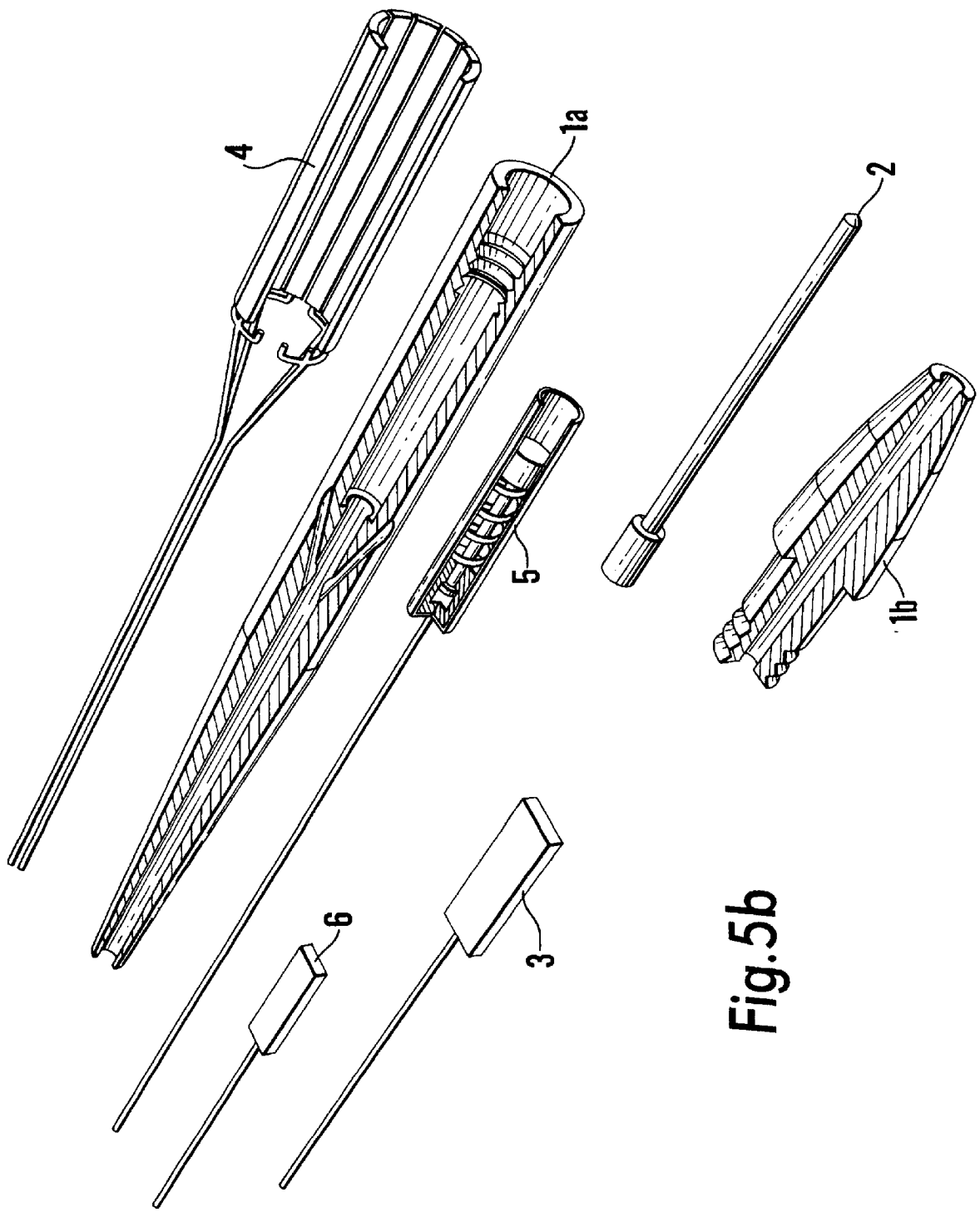
FIG. 5b the writing device in FIG. 5a exploded in its separate components and partly sectioned, and FIG. 6 the writing device in FIG. 5a used together with the writing surface in the form of a registering electronic display device.

The microswitch 5 as shown in FIG. 5b is connected with the detector 3 and activated respectively by the contact of the writing tip 2 with a writing surface and is hence preferably designed as a simple on/off switch. The microswitch 5 hence allows for detection of the time during which the writing tip 2 contacts the writing surface.

Finally the electronic pen according to the invention also comprises a pressure sensor for the detection of the writing pressure and a temperature sensor for detection of temperature. These sensors are connected with the detector 3 and preferably, as shown in FIG. 5a and 5b, integrated into a combined temperature and pressure sensor 4 which is provided around the body part 1a of the housing. The temperature and pressure sensor 4 may be optionally provided, but particularly a detection of the temperature may be of importance, as for instance the heat from the hand of a person who uses the pen for registration of a signature, may influence the sensitivity of the detector 3. The temperature sensor hence will allow for compensation of temperature dependent variations in the sensitivity of the detector 3.

The use of a pressure sensor for the detection of the writing pressure makes it possible to register the latter as a function of time by the generation of an additional data stream for the contact pressure to the data processing device wherein a suitable format for the contact pressure or the writing pressure is generated, this format being stored in further database file and data file. The use of contact pressure in the validation of a personal signature, something which is known per se, is for reasons which have been discussed in the introduction of the application, regarded as less suitable and will hence in any case appear as an optional feature of the present invention.

Figure 6:
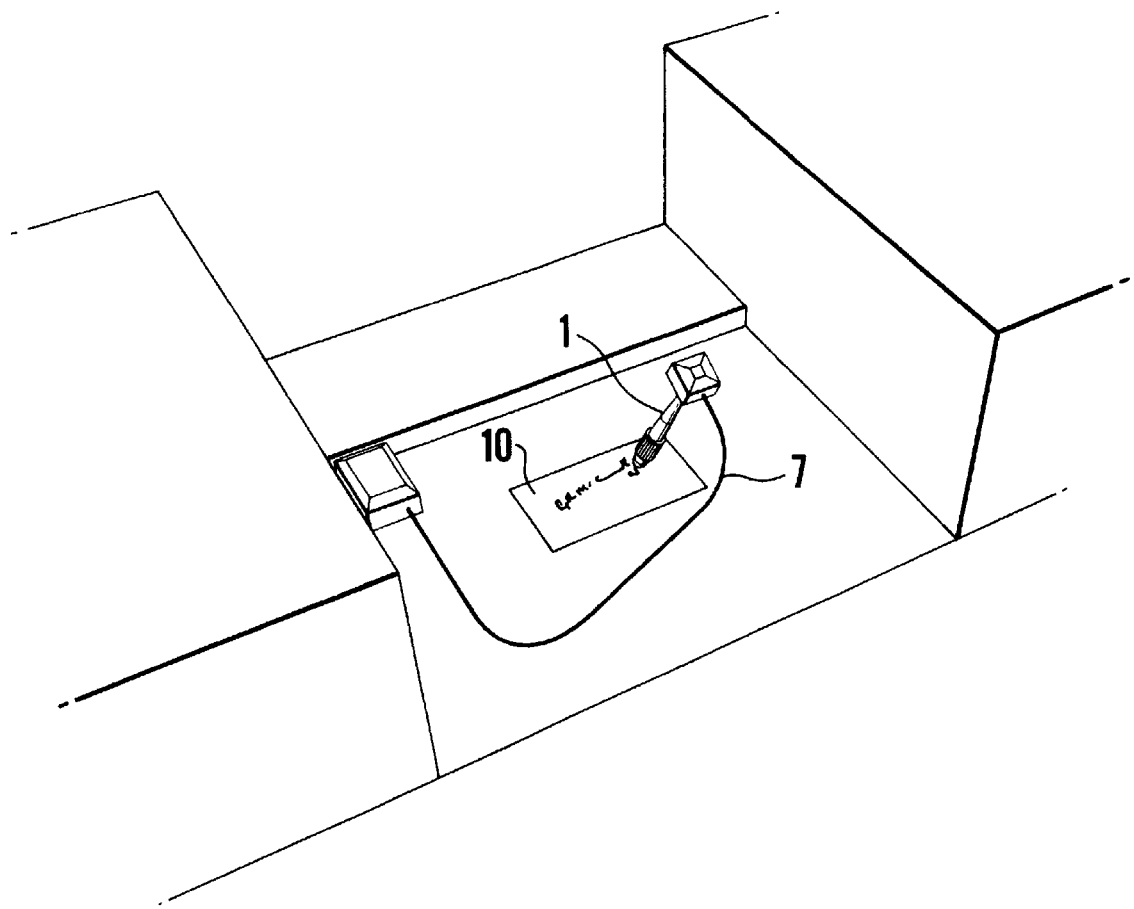

The use of electronic pen according to the invention for registration of a signature is illustrated in FIG. 6. The tip 2 of the pen 1 is pressed against the surface of the pressure sensitive display device 10 and the signature is written in the usual way, but of course, without the use of ink. The detected data is transmitted from the pen to the display device on a wire 7 which simultaneously secures the pen to the display device 10. It should, however, be understood that the data transmission from the pen I equally well may take place in a wireless mode by providing a not shown miniature radio transmitter in connection with the detector 3 in the electronic pen 1.

In order to further increase the security in connection with the validation of a personal signature it may be expedient for a system operator to have a confirmation that the electronic pen employed is approved for use, for instance in a particular location or by a particular person. To this end a random key code could be transmitted from the data processing device to the pen at irregular intervals. The pen would be approved or certified if it now responds by transmitting a return code to the data processing device for validation.

Practically it will be possible to implement this function by means of existing technology in the form of a so-called Sentinel Hardware Lock™. The electronics of a hardware lock of this kind could be built into the pen. This is shown in FIG. 5b, wherein the electronic security lock 6 is provided in the body part 1a of the housing. Existing security software may be used in the certifying process.

Experiments under laboratory conditions with different test persons have shown that by means of the methods according to the present invention and by using the electronic writing device it is possible to distinguish between the persons, even when a relatively simple sign is written. Even a sign as simple as a hand-written x reveals clear differences between the test persons' way of writing x. At the same time it is also evident that each test person's writing of a sign and for the sake of that his whole signature is liable to lie around an average of the written signs and signature for one and the same person within tolerances which are easily determinable. The separate formats which are used in the validation of a signature will hence within the empirical determinable tolerance limits be unique for the singular person.

As stated above, by compiling databases with authenticated registered signatures for persons these databases may be used in systems for personal identification and admission control. A personal identification is desirable where only authorized persons shall have access to enter restricted areas and security areas. In order to authorize an access of this kind there has been used a number of different methods, e.g. fingerprint identification, voice identification or identification based on the pattern of the iris. Most of these methods are more or less secure, but by using the methods according to the present invention in combination with stored databases for authorised signatures, possibly authenticated hand-written signs of different kinds which are uniquely assigned to a person, it is possible to achieve a particularly suitable personal identification and admittance control and with the use of relatively simple technical means.

An instance of an application of interest may be admittance control in order to prevent industrial espionage or personal identification and admittance control, e.g. in military areas. For instance may issue of weapons only take place to persons who are authorized to have weapons issued and generally not each and everybody are given access to the depot or weapon storage. A system based on validation of a personal signature hence makes possible a personal identification which establishes that the person in question has access to the area and a renewed validation of the signature by signing for issued equipment or weapons may act as a double control that it is the authorised person who has received the effects.

The present invention may also be used in banking and payment systems wherein a secure identification of the customer is required. As it is common that the customer under such circumstances signs with a hand-written signature, it is reasonable to suppose that the present method will be psycho-socially acceptable, in other words the requirement for the registration of the personal signature shall not be regarded as undue or as an infringement. In banking and payment systems the writing device with an accompanying pressure sensitive display device may for instance be provided at the counter and the customer signs for the transaction with the writing device according to the invention instead of recording his hand-written signature on a piece of paper. The validation takes place by the customer's verified and authenticated signature which is stored in a data processing device with the database MDB provided in connection with banking or payment system being compared with the signature which is to be validated.

There is nothing to prevent the data processing device being local, for instance being provided at the transaction location, but it may also be a central data processing device which is connected with a transaction location over a data or telecommunication network, something which usually will be the case. The methods and the writing device according to the present invention may then easily be adapted for use in pay terminals, for instance in shops or also minibanks.

An interesting feature of the present invention is that it easily may be implemented in a data communication system and allow identification and authentication of a user against an operator or information supplier. This presupposes then that the end user in the terminal, for instance the personal computer which is included in the data communication system, has connected an electronic and writing device and an accompanying electronic writing tablet in the form of a pressure sensitive display device for registration of the signature. Again it must be presupposed that an already verified and authenticated registration is provided stored in connection with the operator or the information supplier.

In different applications there will also be possible to update data formats in the database files with use of later registered and validated signatures either by adding the formats which represent these successively to the existing compiled data formats and generate new average formats with accompanying tolerance limits and scatter functions such that the updating takes place continuously. Alternatively new and validated registrations may be compiled, formatted and stored in history files, the history files at specific times being converted to data files and updating taking place by a total replacement of the original database files with converted history files. In both cases the updating could be used to care for systematic trend changes, e.g. of an aging-determined nature.

The implementation of the database, the compilation of the data formats and the validation takes place using proprietary or commercially available software which employs algorithms and procedures well-known to persons skilled in the art and are hence not being further discussed herein.

When there in the preceding all the time has been spoken of a personal signature, it is to be understood that this concerns a hand-written personal signature. Further it is to be understood that the personal signature not necessarily is a name signature but might just as well be a hand-drafted or hand-written pattern, hand-written call name, hand-written code word and any beforehand agreed string of alphanumerical characters which might serve to identify the user. Normally in most instances probably the user's hand-written name signature will be the preferred form of the personal signature which is to be validated.

What is claimed is:

1. A method for registration, analysis and validation of a hand-written personal signature, characterized by registering the signature on a writing surface substantially defined in an x,y plane by means of a writing device which at one end has provided a writing tip for contact with said writing surface and further comprises a multiaxis movement detector detecting the movement of said writing device as function of time and with six degrees of freedom, said six degrees of freedom given by a linear movement along an x axis, a y axis and a z axis respectively, as well as by rotation about said x axis, said y axis and said z axis respectively, generating on basis of the detected movement of said writing device respectively a first data stream D1 for the movement of said writing device with only two degrees of freedom as function of time (2-dimensional tracking), said two degrees of freedom given by the linear movement along said x axis and the linear movement along said y axis, a second data stream D2 for the movement of said writing device with all six degrees of freedom as function of time (6-dimensional tracking), a third data stream D3 for the contact of said writing device with the writing surface at said writing tip as function of time and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device for analysis and storage of the registered signature in a database, transforming said data streams D1, D2, D3, D4 in said data processing device into predetermined formats which represent a personal signature and are stored in said database contained in said data processing device, said database comprising a data file for each predetermined format, and validating a newly registered personal signature by comparison with an authenticated corresponding personal signature already stored in the database.

2. A method according to claim 1, characterized by using a pressure sensitive display device as a writing surface, and by the first data stream D1 being generated by the pressure sensitive display device by the writing tip's contact with said writing surface and representing the signature's 2-dimensional pattern in the x,y plane formed by said writing surface, said 2-dimensional pattern under registration being visualized by said display device.

3. A method according to claim 1, characterized by data being transmitted from the writing device to the data processing device with a predetermined rate, said data transmission taking place over a wireless communication line or over a cable-based communication line.

4. A method according to claim 1, characterized by the clock function being generated by a clock in the data processing device or by an external clock connected with said data processing device.

5. A method for compilation of a database MBD with authenticated hand-written personal signatures which are used for validation of the authenticity of newly registered corresponding personal signatures, characterized by registering a signature on a writing surface substantially defined in an x,y plane by means of a writing device which at one end has provided a writing tip for contact with said writing surface and further comprises a multiaxis movement detector, detecting the movement of said writing device as function of time and with six degrees of freedom, said six degrees of freedom given by a linear movement along an x axis, a y axis and a z axis respectively, as well as by rotation about said x axis, said, y axis and said z axis respectively, generating on the basis of the detected movement of said writing device respectively a first data stream D1 for the movement of said writing device with only two degrees of freedom as function of time (2-dimensional tracking) said two degrees of freedom given by the linear movement along said x axis and the linear movement along said y axis, a second data stream D2 for the movement of said writing device with all six degrees of freedom as function of time (6-dimensional tracking)[ a] third data stream D3 for the contact of said writing device with said writing surface at said writing tip as function of time and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device, transforming data from said first data stream D1 into a 2-dimensional vector format VF1 which is stored in a first database file DF-A, transforming data from said second data stream D2 into a 3-dimensional vector format VF2 which is stored in a second database file DF-B, transforming data from said third data stream D3 into a table format TF1 which is stored in a third database file DF-C and transforming data from said fourth data stream D4 into a start/stop point of time format and a time duration format TF2 which are stored in a fourth database file DF-D, said database files DF-A, DF-B, DF-C, DF-D being contained in the database MDB which is stored in said data processing device and a possible further central data processing device.

6. A method for compilation of a database MDB with authenticated handwritten personal signatures which are used for validation of the authenticity of newly registered corresponding signatures, characterized by registering the signature a repeated number of times on a writing surface substantially defined in an x,y plane by means of a writing device which at one end has provided a writing tip for contact with said writing surface and further comprises a multiaxis movement detector, detecting the movement of said writing device as function of time and with six degrees of freedom, said six degrees of freedom being given by a linear movement along an x axis, a y axis and a z axis respectively as well as by rotation about said x axis, said y axis and said z axis respectively generating on basis of the detected movement of said writing device respectively a first data stream D1 for the movement for said writing device with only two degrees of freedom as function of time (2-dimensional tracking), said two degrees of freedoms being given by the linear movement along said x axis and the linear movement along said y axis, a second data stream D2 for the movement of said writing device with all six degrees of freedom as function of time (6-dimensional tracking), a third data stream D3 for the contact of said writing device with said writing surface at said writing tip as function of time, and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device, transforming data from said first data stream D1 into a 2-dimensional vector format VF1 which is stored in a first database file DF-A, transforming data from said second data stream into a 3-dimensional vector format VF2 which is stored in a second database file DF-B, transforming data from said third data stream D3 into a table format TF1 which is stored in a third database file DF-C, transforming data from said fourth data stream D4 into a start/stop point of time format and a time duration format TF2 which are stored in a fourth database file DF-D, said database files DE-A, DF-B, DF-C and DF-D being contained in the database MDB which is stored in said data processing device and a possible further central data processing device, generating said 2-dimensional vector format VF1, said 3-dimensional vector format VF2, said table format TF1 and said start/stop point of time format and time duration format TF2 as respective average formats with an upper and lower tolerance limit, said upper and lower tolerance limits being determined on the basis of scatter values for repeated registrations of the personal signature and related to said respective average format, and for each format as function of time generating a scatter function on the basis of scatter values for the format, said average formats with the accompanying tolerance limits and scatter functions being stored in said database files DF-A, DF-B, DF-C and DF-D respectively.

7. A method according to claim 6, characterized by the average formats with an upper and lower tolerance limit and accompanying scatter function being generated in the data processing device.

8. A method according to claim 5 or 6, characterized by using a pressure sensitive display device as the writing surface, generating the first data stream D1 by the pressure sensitive display device by the contact of the writing tip with said writing surface and representing the 2-dimensional pattern of the signature in the x,y-plane formed by the writing surface, transforming the data from the second data stream D2 into a virtual 2-dimensional signature on a vector format VF3, the vector format VF I for said first data stream D1 and said vector format VF3 for said virtual 2-dimensional signature both being stored in the first database file DF-A, and from said vector format VF1 for said first data stream D1 and said vector format VF3 for said virtual 2-dimensional signature generating a differential vector format ΔVF which likewise is stored in said database file DF-A.

9. A method according to claim 5 or 6, characterized by the database MDB being secured against unauthorized access with means specific for an application which demands validation of a personal signature.

10. A method according to claim 5 or 6, characterized by the data in the database file DF-C and/or the database file DF-D being encrypted in an ASCII-code.

11. A method for registration, analysis and validation of a hand-written personal signature characterized by registering the signature on a writing surface substantially defined in an x,y plane by means of a writing device which, at one end, has provided a writing tip for contact with said writing surface and further comprises a multiaxis movement detector, detecting the movement of said writing device as a function of time and with six degrees of freedom, said six degrees of freedom given by a linear movement along an x-axis, a y-axis and a z-axis, respectively, as well as by rotation about said x-axis, said y-axis and said z-axis, respectively, generating on the basis of the detected movement of said writing device, respectively, a first data stream D1 for the movement of said writing device with only two degrees of freedom as a function of time (2-dimensional tracking), said two degrees of freedom given by the linear movement along said x-axis and the linear movement along said V-axis, a second data stream D2 for the movement of said writing device with all six degrees of freedom as a function of time (6-dimensional tracking), a third data stream D3 for the contact of said writing device with the writing surface at said writing tip as a function of time and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device for analysis and storage of the registered signature in a database, transforming said data streams D1, D2, D3, D4 in said data processing device into predetermined formats which represent a personal signature and are stored in said database contained in said data processing device, said database comprising a data file for each predetermined format, and validating a newly registered personal signature by comparison with an authenticated corresponding personal signature already stored in the database, said data processing device contains a main database MDB for storage of registered signatures in predetermined data formats and compiled by registering the signature a repeated number of times on a writing surface substantially defined in an x,y plane by means of a writing device which, at one end, has provided a writing tip for contact with said writing surface and further comprises a multiaxis movement detector, detecting the movement of said writing device as a function of time and with six degrees of freedom, said six degrees of freedom being given by a linear movement along an x-axis, a y-axis and a z-axis, respectively, as well as by rotation about said x-axis, said y-axis and said z-axis, respectively, generating on the basis of the detected movement of said writing device, respectively, a first data stream D1 for the movement for said writing device with only two degrees of freedom as a function of time (2-dimensional tracking), said two degrees of freedom being given by the linear movement along said x-axis and the linear movement along said y-axis, a second data stream D2 for the movement of said writing device with all six degrees of freedom as a function of time (6-dimensional tracking), a third data stream D3 for the contact of said writing device with said writing surface at said writing tip as a function of time, and a fourth data stream D4 for a clock function, said clock function providing a time scale whereto the detection of the movement and the three first data streams D1, D2, D3 are referred, transmitting said data streams D1, D2, D3, D4 to a data processing device connected with said writing device, transforming data from said first data stream D1 into a 2-dimensional vector format VF1 which is stored in a first database file DF-A, transforming data from said second data stream into a 3-dimensional vector format VF2 which is stored in a second database file DF-B, transforming data from said third data stream D3 into a table format TF1 which is stored in a third database file DF-C, transforming data from said fourth data stream D4 into a start/stop point of time format and a time duration format TF2 which are stored in a fourth database file DF-D, said database files DF-A, DF-B, DF-C and DF-D being contained in the database MDB which is stored in said data processing device and a possible further central data processing device, generating said 2-dimensional vector format VF1, said 3-dimensional vector format VF2, said table format TF1 and said start/stop point of time format and time duration format TF2 as respective average formats with an upper and lower tolerance limit, said upper and lower tolerance limits being determined on the basis of scatter values for repeated registrations of the personal signature and related to said respective average format, and for each format as a function of time generating a scatter function on the basis of scatter values for the format, said average formats with the accompanying tolerance limits and scatter functions being stored in said database files DF-A, DF-B, DF-C and DF-D, respectively, and wherein the validation takes place by comparing a newly registered personal signature with a representation of an authorized corresponding personal signature already stored in said database MDB in database files DF-A, DF-B, DF-C and DF-D, characterized by the method comprising transforming data from the first data stream D1 into a 2-dimensional vector format VF1* which is stored in a first data file DF-1, optionally further transforming data from the second data stream D2 into a virtual 2-dimensional signature on vector format VF3* which is also stored in said first data file DF-1, transforming data from the second data stream D2 into a 3-dimensional vector format VF-2* which is stored in a second data file DF-2, transforming data from the third data stream D3 into a table format VF1* which is stored in a third data file DF-3, transforming data from the fourth data stream DF-4 into a start/stop point of time format and time duration format TF2* which is stored in a fourth data file DF-4 and thereafter comparing data of said data file DF-1 with data of said database file DF-A, said comparison constituting a first validation level VL1, comparing data of said data file DF-2 with data of said database file DF-B, said comparison constituting a second validation level VL2, comparing data of said data file DF-3 with data of said database file DF-C, said comparison constituting a third validation level VL3, comparing the data of said data file DF-4 with data of said database file DF-D, said comparison constituting a fourth validation level VL4, generating a scatter function for each of the data formats stored in one of said data files DF-1, DF-2, DF-3, DF-4 on the basis of the result of comparisons on the respective assigned validation levels VL1, VL2, VL3, VL4, comparing said scatter function for one or more of the data formats stored in said data files DF-1, DF-2, DF-3, DF-4 with a scatter function for average data formats stored in the respective database files DF-A, DF-B, DF-C and DF-D and which represent the stored and authorized corresponding signature, said comparison constituting a fifth validation level VL5, and validating the signature as authentic if and only if the result of the comparison performed on one or more of said validation levels VL1, VL2, VL3, VL4, VL5 for the four first validation levels VL1, VL2, VL3, VL4 without exact match between the data formats in the data file and the database file falls within a predetermined upper and lower tolerance limit of each of these validation levels and the result of the comparison on the fifth validation level VL5 provides a positive correlation for this validation level above a given lower limit of the correlation value.

12. A method according to claim 11, characterized by the data from the second data stream D2 being transformed into the virtual 2-dimensional signature by replaying the data as an animation sequence and by the signature being registered as written by a 2-dimensional virtual writing device.

13. A method according to claim 11, characterized by using either the 2-dimensional vector formats VF1, VF* or the virtual 2-dimensional signatures VF3, VF3* or both formats VF1, VF1* and formats VF3, VF3* for the comparison on validation level VL1.

14. A method according to claim 11 wherein a method according to claim 8 is used for the compilation of the database MDB, characterized by generating a differential vector format $\Delta VF^*$ from the vector format VF1* of the first data stream D1 and the vector format VF3 * of the virtual 2-dimensional signature and which likewise is stored in the data file DF-1, and comparing in the validation on validation level VL1 the differential vector format $\Delta VF^*$ in the data file DF-1 with the differential vector format $\Delta VF$ in the database file DF-A.

15. A method according to claim 11, characterized by using the validation level VL5 together with the validation level VL1 or the validation level VL2.

16. A method according to claim 15, characterized by using the validation level VL2 together with the validation level VL5 for a maximum security.

17. An electronic writing device, particularly an electronic pen for use with the methods according to one of the claims 5 or 6 or 11, wherein the writing device (1) at a first end has provided a writing tip (2) for writing on a writing surface, characterized by the writing device (1), comprising a detector (3) for detection of a writing movement respectively as x, y, z coordinates of said detector in a suitable frame of reference and as a rotation of said detector (3) about one of the axes x, y, z in the same frame of reference, a transmitter device connected with said detector (34) for transmission of the detected data on a communication line to a data processing device, and a microswitch (5) provided at the writing tip (2) for detection of the contact of said writing tip (2) with the writing surface, said microswitch (5) being activated respectively by the contact of said writing tip (2) with said writing surface and the cessation of the contact of said writing tip (2Z) with said writing surface.

18. An electronic writing device according to claim 17, characterized by the detector (3) being a 3-axis accelerometer with six degrees of freedom, said accelerometer (3) being assigned preferably to an ortogonal 3-dimensional frame of reference.

19. An electronic writing device according to claim 17, characterized by the detector (3) being connected to a clock which provides a timing control of the detection and a time scale of the detected movement.

20. An electronic writing device according to claim 17, characterized by the writing device (1) comprising a pressure sensor (4) for detection of a writing pressure and/or a temperature sensor (4) connected with the detector (3) and optionally also with said pressure sensor (4) for use in compensation of temperature related variations in the sensitivity of said detector or said pressure sensor.

* * * * *

UNITED STATES PATENT AND TRADEMARK OFFICE
CERTIFICATE OF CORRECTION

PATENT NO. : 6,148,093
DATED : November 14, 2000
INVENTOR(S) : McConnell et al.

It is certified that error appears in the above-identified patent and that said Letters Patent is hereby corrected as shown below:

On the title page:
Under Section "[30] Foreign Application Priority Data" change "Sep. 10, 1996" to -- Sep. 18, 1996 --.

Claim 5, Col. 20, line 34, change "[ a]" to -- , a --.

Claim 11, Col. 22, line 18, change "V-axis" to -- y-axis --.

Signed and Sealed this

Twenty-ninth Day of May, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO.    : 6,148,093
DATED         : November 14, 2000
INVENTOR(S)   : McConnell et al.

It is certified that error appears in the above-identified patent and that said Letters Patent is hereby corrected as shown below:

Title page,
Item [30], Foreign Application Priority Data, change "Sept. 10, 1996" to -- Sept. 18, 1996 --.

Column 20,
Line 34, change "[ a]" to -- , a --.

Column 22,
Line 18, change "V-axis" to -- y-axis --.

Signed and Sealed this

Tenth Day of May, 2005

JON W. DUDAS
*Director of the United States Patent and Trademark Office*